United States Patent
Goodman et al.

(10) Patent No.: US 8,099,439 B2
(45) Date of Patent: Jan. 17, 2012

(54) SYSTEM AND METHOD FOR GENERATING A UNIFIED SERVICE MODEL

(75) Inventors: Greg S. Goodman, Santa Barbara, CA (US); Donald E. LeClair, Franklin, MA (US); Maurice H. Donegan, III, Wrentham, MA (US)

(73) Assignee: Computer Associates Think, Inc., Islandia, NY (US)

( * ) Notice: Subject to any disclaimer, the term of this patent is extended or adjusted under 35 U.S.C. 154(b) by 413 days.

(21) Appl. No.: 12/103,155

(22) Filed: Apr. 15, 2008

(65) Prior Publication Data
US 2009/0259630 A1    Oct. 15, 2009

(51) Int. Cl.
*G06F 7/00*    (2006.01)
*G06F 17/30*   (2006.01)

(52) U.S. Cl. ......................................................... 707/802

(58) Field of Classification Search .................. None
See application file for complete search history.

(56) References Cited

U.S. PATENT DOCUMENTS

| | | | |
|---|---|---|---|
| 7,350,190 B2 * | 3/2008 | Torres et al. | 717/105 |
| 7,568,019 B1 * | 7/2009 | Bhargava et al. | 709/223 |
| 2006/0161466 A1 * | 7/2006 | Trinon et al. | 705/7 |
| 2008/0270201 A1 * | 10/2008 | Flaxer et al. | 705/7 |

OTHER PUBLICATIONS

Li-Jie Jin et al, "Analysis on Service Level Agreement of Web Services", HPL 2002, 13 pages.*

* cited by examiner

*Primary Examiner* — Uyen T. Le
(74) *Attorney, Agent, or Firm* — BAker Botts L.L.P.

(57) ABSTRACT

In accordance with a particular embodiment of the present disclosure, configuration items are received. The configuration items include configuration data for at least one service. Key indicators are received. The key indicators include metrics for the performance of the service. At least one association is identified between the configuration items and the key indicators. A unified service model is generated based on the association. The unified service model includes at least a graphical representation of the service and service requirements.

21 Claims, 1 Drawing Sheet

SYSTEM AND METHOD FOR GENERATING A UNIFIED SERVICE MODEL

TECHNICAL FIELD

The present disclosure relates generally to data models, and more particularly to a method and system for generating a unified service model.

BACKGROUND

Organizations deploy information technology (IT) services to support businesses. For example, organizations may deploy business services such as software as a service, web services, and virtualization services. However, deployment of these technologies frequently results in missed service levels, cost overruns, and low customer satisfaction.

SUMMARY

In accordance with the present invention, the disadvantages and problems associated with previous techniques may be reduced or eliminated.

In accordance with a particular embodiment of the present disclosure, a method includes receiving configuration items. The configuration items include configuration data for at least one service. The method also includes receiving key indicators. The key indicators include metrics for the performance of the service. The method further includes identifying at least one association between the configuration items and the key indicators. The method further includes generating a unified service model based on the association. The unified service model includes at least a graphical representation of the service and service requirements.

Technical advantages of particular embodiments of the present disclosure include a system and method for generating a unified service model that includes a graphical representation of a particular service and service requirements. For example, the unified service model may include configuration items that include configuration data for at least one service. The unified service model may include a graphical representation of the configuration items, infrastructure assets, and service requirements, such as a service level agreement (SLA).

Further technical advantages of particular embodiments of the present disclosure include a system and method for generating a unified service model where third party services may be integrated. For example, the unified service model may implement a common taxonomy for classifying configuration items from third party services. Thus, third party services may be integrated into the unified service model and the unified service model may provide a single point of management for different services.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

As part of business service delivery, IT organizations have become focused on demonstrating increased value in areas of service improvement and secure environments. However, the complexity of some IT environments prevents many IT organizations from responding quickly to service requirements. Instead, IT organizations devote resources to managing different services with limited returns on investment.

In accordance with the teachings of the present disclosure, a unified service model is generated that includes a graphical representation of a particular service and service requirements. The unified service model may include a configuration management database for cataloging and defining services, a common taxonomy for classifying configuration items, and a federated communication interface for receiving requests from different services.

The unified service model may provide a graphical representation to review service performance and adjust investment levels in the service according to service requirements such as service levels, budget requirements, and risks, as examples. The federated communication interface facilitates requests from other services in a network. Therefore, the unified service model may integrate different services into a graphical representation. Additional details of example embodiments of the present disclosure are described in detail below.

Figure 1:
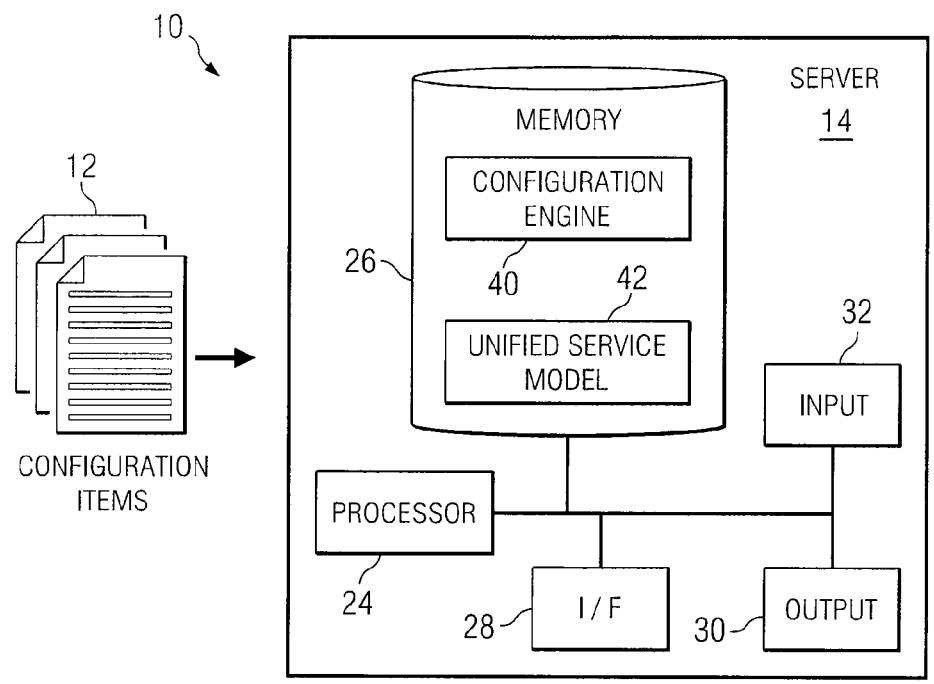
FIG. 1 is a block diagram illustrating a system for generating a unified service model, according to the teachings of the present disclosure.

FIG. 1 is a block diagram illustrating a system 10 for generating a unified service model 42, according to the teachings of the present disclosure. System 10 generally includes one or more configuration items 12, a server 14, a configuration engine 40, and unified service model 42. In particular embodiments, configuration engine 40 on server 14 may receive configuration items 12 that define the services modeled by unified service model 42.

Configuration items 12 may refer to any suitable data received and stored at server 14. In particular embodiments, configuration item 12 may include configuration data for a particular service. For example, configuration item 12 may identify assets, such as infrastructure assets supporting the particular service. As another example, configuration item 12 may identify personnel resources allocated to the particular service.

In particular embodiments, configuration item 12 may include interrelationships between other configuration items 12 for the particular service. For example, configuration item 12 may identify a priority of an infrastructure asset and may map the asset to the particular service it supports.

Server 14 may refer to any suitable device operable to execute configuration engine 40 and generate a unified service model 42. Examples of server 14 may include a host computer, workstation, web server, file server, a personal computer such as a laptop, or any other suitable device. Server 14 may include any operating system such as MS-DOS, PC-DOS, MAC-OS, WINDOWS, UNIX, or other appropriate operating systems, including future operating systems.

Configuration engine 40 may include any suitable logic and/or hardware that receives configuration items 12 and stores configuration items 12 in a configuration management database. The configuration management database may be shared by one or more applications. For example, the configuration management database may be shared by a support ticket application, a network management application, an asset management application, and a portfolio management application.

In particular embodiments, configuration engine 40 may provide a federated communication interface, such as a federated application programming interface (API). For example, the federation communication interface may provide standards that define how services may integrate service data with the configuration management database. In the example, federated communication interface facilitates requests from other services in a network. In particular embodiments, configuration engine 40 may receive service data through web services.

In particular embodiments, configuration engine 40 may receive key indicators. Key indicators may include one or more metrics for the performance of a particular service. For example, key indicators may include infrastructure availability data, performance data, response time data, operating expenses, and service level agreement (SLA) compliance.

In particular embodiments, configuration engine 40 may identify associations between configuration items 12 and key indicators to generate unified service model 42. Unified service model 42 may include a graphical representation of a particular service and service requirements. Therefore, unified service model 42 provides more information than a typical data model that generally tracks configurations and assets. For example, a standard data model may include configuration of infrastructure assets supporting a service. Unified service model 42 provides a graphical representation that may include the budget for delivering a service, the personnel, assets, and projects that support the service, and the service levels of the service, as examples. Additional details of unified service model 42 are provided with reference to FIG. 2. Additional details of the other components of server 14 are described below.

Processor 24 may refer to any suitable device operable to execute instructions and manipulate data to perform operations for server 14. Processor 24 may include, for example, any type of central processing unit (CPU).

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface (I/F) 28 may refer to any suitable device operable to receive input, send output, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows server 14 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Input device 32 may refer to any suitable device operable to input, select, and/or manipulate various data and information. Input device 32 may include, for example, a keyboard, mouse, graphics tablet, joystick, light pen, microphone, scanner, or other suitable input device. Additional details of example embodiments of the disclosure are described in greater detail below in conjunction with portions of FIG. 2 and FIG. 3.

Figure 2:
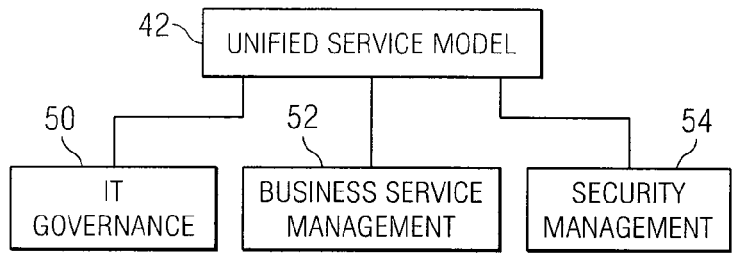
FIG. 2 is a block diagram illustrating one embodiment of the unified service model of the system of FIG. 1, according to the teachings of the present disclosure.

FIG. 2 is a block diagram illustrating one embodiment of unified service model 42 of system 10 of FIG. 1, according to the teachings of the present disclosure. As shown in the illustrated embodiment, unified service model 42 includes an IT governance module 50, a business service management module 52, and a security management module 54.

As described above, configuration items for a service may be stored within a configuration management database. These configuration items may be shared by applications such as a support ticket application, a network management application, an asset management application, and a portfolio management application. Unified service model 42 incorporates integration capabilities and associates configuration items to provide service insight. Examples of this integration are effected, in one embodiment, by IT governance module 50, business service management module 52, and security management module 54.

For example, IT governance module 50 may include any suitable logic and/or hardware to provide governance information for a service. In particular embodiments, IT governance module 50 may include a business case for a service, a service catalog that includes assets supporting a service, a service definition, and risk assessments for a service, as examples.

As another example, business service management module 52 may include any suitable logic and/or hardware that provides management information for a service. In particular embodiments, business service management module 52 may include infrastructure assets and a service the assets support, SLAs, and monitoring criteria to manage a service, as examples. In particular embodiments, business service management module 52 may include issue tracking to log, track, manage, and service issues. In particular embodiments, business service management module 52 may manage change management to services.

As another example, security management module 54 may include any suitable logic and/or hardware that provides security information for a service. In particular embodiments, security management module 54 may include policy-based controls and identity management information, as examples. In particular embodiments, security management module 54 may automate identity management including identity creation, modification, and deletion. In particular embodiments, security management module 54 may mitigate threats by identifying threats, determine which assets are affected, and take immediate steps to resolve the threat.

As an example of the operation of IT governance module 50, business service management module 52, and security management module 54, if a user experiences an issue with the service, the user may open a support ticket on the service. The support technicians may have direct access to the security management module 54 to identify a threat and they can make quick decisions to restore service.

In particular embodiments, the support technicians may also use unified service model 42 to access federated information in the monitoring solutions such as a network management application, an asset management application, and a portfolio management application. Information on the configuration items is accessible in a service definition, which can be viewed through IT governance module 50. In addition, the SLAs may be available through the business service management module 52 to analyze how these issues impact the service level.

As described above, unified service model 42 improves problem analysis by incorporating information from IT governance module 50, a business service management module 52, and a security management module 54 to presenting a graphical representation of the service and the service requirements. However, it should be noted that in particular embodiments, unified service model 42 may include some, all, or none of the enumerated modules. Unified service model 42 may include other well-known modules. For example, unified service model 42 may include a module to provide service inventory, budget requirements, and availability metrics of the service. The metrics provided by the module may facilitate a quantitative assessment of services performed and the context for achieving the service requirements.

Figure 3:
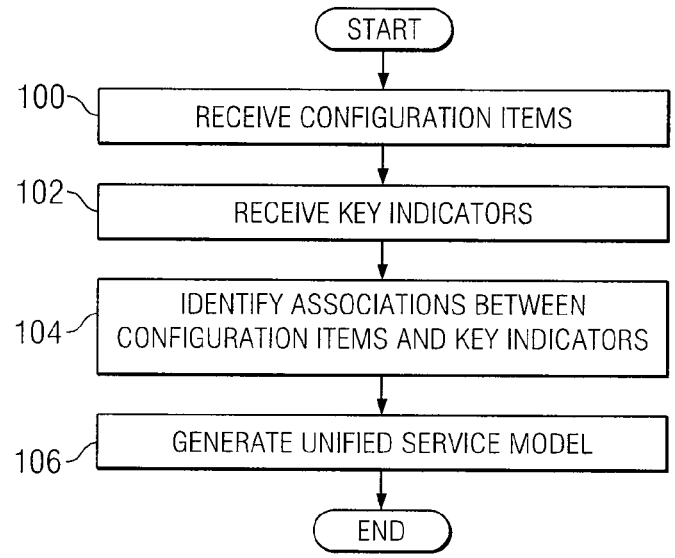
FIG. 3 is a flow diagram illustrating a method for generating a unified service model, according to the teachings of the present disclosure.

FIG. 3 is a flow diagram illustrating a method for generating a unified service model, according to the teachings of the present disclosure. The method begins at step 100 where configuration items are received. For example, configuration items may refer to any suitable configuration data received and stored for a particular service. At step 102, key indicators are received. For example, key indicators may refer to metrics for the performance of a particular service. Key indicators may include performance data, response time data, operating expenses, and service level agreement (SLA) compliance, as examples.

At step 104, associations between configuration items and key indicators are identified. For example, associations may be identified regarding the costs of delivering a service, the people, and projects that support the service, and the service levels of the service, as examples. At step 106, a unified service model is generated. The unified service model includes at least a graphical representation of a service and service requirements. For example, based on the identified associations, the unified service model may include configuration items that define a particular service and it may include infrastructure status as measured against business-defined service requirements, such as an SLA.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method, comprising:
   receiving a plurality of configuration items, the plurality of configuration items comprising configuration data for at least one service;
   receiving a plurality of key indicators, the plurality of key indicators comprising a plurality of metrics that each indicate a quantitative assessment of the measured performance of the at least one service;
   identifying at least one association between the plurality of configuration items and the plurality of key indicators; and
   generating a unified service model based on the at least one association, the unified service model comprising at least a graphical representation of the at least one service and a plurality of service requirements of the service.

2. The method of claim 1, further comprising:
   storing the plurality of configuration items in a configuration management database; and
   identifying one or more of the plurality of configuration items for the at least one service.

3. The method of claim 1, further comprising providing a federated communication interface for receiving a plurality of requests from a plurality of different services.

4. The method of claim 1, further comprising providing a common taxonomy for classifying the plurality of configuration items.

5. The method of claim 1, further comprising defining a service catalog for the at least one service, the service catalog comprising a plurality of assets supporting the at least one service.

6. The method of claim 1, wherein the plurality of service requirements comprises at least one service level agreement (SLA) associated with the at least one service.

7. The method of claim 1, wherein the plurality of service requirements comprises at least one budget requirement associated with the at least one service.

8. The method of claim 1, the unified service model further comprising a graphical representation of a plurality of measured assessments, each measured assessment indicating an assessment of the measured performance of a service requirement.

9. A system, comprising:
   a storage device; and
   a processor, the processor operable to execute a program of instructions operable to:
      receive a plurality of configuration items, the plurality of configuration items comprising configuration data for at least one service;
      receive a plurality of key indicators, the plurality of key indicators comprising a plurality of metrics that each indicate a quantitative assessment of the measured performance of the at least one service;
      identify at least one association between the plurality of configuration items and the plurality of key indicators; and
      generate a unified service model based on the at least one association, the unified service model comprising at least a graphical representation of the at least one service and a plurality of service requirements of the service.

10. The system of claim 9, wherein the program of instructions is further operable to:
    store the plurality of configuration items in a configuration management database; and
    identify one or more of the plurality of configuration items for the at least one service.

11. The system of claim 9, wherein the program of instructions is further operable to provide a federated communication interface for receiving a plurality of requests from a plurality of different services.

12. The system of claim 9, wherein the program of instructions is further operable to provide a common taxonomy for classifying the plurality of configuration items.

13. The system of claim 9, wherein the program of instructions is further operable to define a service catalog for the at least one service, the service catalog comprising a plurality of assets supporting the at least one service.

14. The system of claim 9, wherein the plurality of service requirements comprises at least one service level agreement (SLA) associated with the at least one service.

15. The system of claim 9, wherein the plurality of service requirements comprises at least one budget requirement associated with the at least one service.

16. Logic encoded in media, the logic being operable, when executed on a processor, to:
receive a plurality of configuration items, the plurality of configuration items comprising configuration data for at least one service;
receive a plurality of key indicators, the plurality of key indicators comprising a plurality of metrics that each indicate a quantitative assessment of the measured performance of the at least one service;
identify at least one association between the plurality of configuration items and the plurality of key indicators; and
generate a unified service model based on the at least one association, the unified service model comprising at least a graphical representation of the at least one service and a plurality of service requirements of the service.

17. The logic of claim 16, wherein the logic is further operable to:
store the plurality of configuration items in a configuration management database; and
identify one or more of the plurality of configuration items for the at least one service.

18. The logic of claim 16, wherein the logic is further operable to provide a federated communication interface for receiving a plurality of requests from a plurality of different services.

19. The logic of claim 16, wherein the logic is further operable to provide a common taxonomy for classifying the plurality of configuration items.

20. The logic of claim 16, wherein the logic is further operable to define a service catalog for the at least one service, the service catalog comprising a plurality of assets supporting the at least one service.

21. The logic of claim 16, wherein the plurality of service requirements comprises at least one service level agreement (SLA) associated with the at least one service.

* * * * *